United States Patent
Akhlaghi Bouzan et al.

(10) Patent No.: US 11,927,757 B1
(45) Date of Patent: Mar. 12, 2024

(54) ELECTRONIC DEVICE DISPLAY HAVING DISTORTION COMPENSATION

(71) Applicant: Apple Inc., Cupertino, CA (US)

(72) Inventors: Milad Akhlaghi Bouzan, Redwood City, CA (US); William W Sprague, San Francisco, CA (US); Anup Rathi, Milpitas, CA (US); Duncan A McRoberts, Boulder, CO (US); Tahereh Majdi, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 32 days.

(21) Appl. No.: 17/967,739

(22) Filed: Oct. 17, 2022

Related U.S. Application Data

(60) Provisional application No. 63/394,200, filed on Aug. 1, 2022, provisional application No. 63/273,808, filed on Oct. 29, 2021.

(51) Int. Cl.
*G02B 27/01* (2006.01)
*G02B 27/00* (2006.01)

(52) U.S. Cl.
CPC ..... *G02B 27/0172* (2013.01); *G02B 27/0093* (2013.01); *G02B 2027/011* (2013.01); *G02B 2027/0138* (2013.01); *G02B 2027/014* (2013.01)

(58) Field of Classification Search
USPC .......................................................... 345/7
See application file for complete search history.

(56) References Cited

U.S. PATENT DOCUMENTS

| | | | |
|---|---|---|---|
| 10,156,722 B2 | 12/2018 | Gao et al. | |
| 10,231,614 B2 | 3/2019 | Krueger | |
| 10,395,349 B1* | 8/2019 | Zhang | G06T 1/60 |
| 10,432,920 B2 | 10/2019 | Benitez et al. | |
| 10,571,251 B2 | 2/2020 | Edwin et al. | |
| 10,573,271 B1* | 2/2020 | Lvovskiy | A42B 3/042 |
| 11,107,200 B2 | 8/2021 | Jones et al. | |
| 11,132,055 B2 | 9/2021 | Jones et al. | |
| 11,823,317 B2* | 11/2023 | Fenney | G06T 3/0093 |
| 2003/0043303 A1* | 3/2003 | Karuta | G03B 27/68 348/744 |
| 2016/0140713 A1* | 5/2016 | Martin | H04N 25/611 382/154 |
| 2018/0139437 A1* | 5/2018 | Hwang | H04N 13/327 |
| 2019/0056590 A1* | 2/2019 | Chuang | G02B 7/14 |

(Continued)

*Primary Examiner* — Chineyere D Wills-Burns
(74) *Attorney, Agent, or Firm* — Treyz Law Group, P.C.; Joseph F. Guihan

(57) ABSTRACT

An electronic device may have a display panel with an array of display pixels. Light from the display panel may be focused by a lens assembly towards a viewer. The presence of the lens assembly may cause geometric distortion for a viewer viewing images on the display through the lens assembly. To mitigate geometric distortion, geometric distortion compensation may be performed in the electronic device. The electronic device may include both a fixed lens element and a removable lens element in the lens assembly. The removable lens element may be changed, allowing the distortion function associated with the lens assembly to change over time. To dynamically compensate for geometric distortion caused by a lens assembly with a removable lens, ray tracing may be used to determine the geometric distortion caused by the lens assembly depending upon the particular removable lens that is present in the lens assembly.

22 Claims, 11 Drawing Sheets

(56) References Cited

U.S. PATENT DOCUMENTS

| | | | |
|---|---|---|---|
| 2019/0080517 A1* | 3/2019 | You | G06T 7/85 |
| 2019/0179409 A1* | 6/2019 | Jones | G02B 27/0172 |
| 2019/0385342 A1 | 12/2019 | Freeman et al. | |
| 2020/0051219 A1* | 2/2020 | Pohl | G06T 5/006 |
| 2020/0174284 A1* | 6/2020 | Chan | G02B 7/023 |
| 2020/0225477 A1* | 7/2020 | Chan | G02B 27/0172 |
| 2020/0301239 A1* | 9/2020 | Akkaya | G02B 27/0172 |
| 2021/0033878 A1* | 2/2021 | Ruan | G02B 13/0065 |
| 2022/0413291 A1* | 12/2022 | Price | G09G 3/3433 |

* cited by examiner

(12)  United States Patent

ELECTRONIC DEVICE DISPLAY HAVING DISTORTION COMPENSATION

This application claims the benefit of provisional patent application No. 63/273,808, filed Oct. 29, 2021, and provisional patent application No. 63/394,200, filed Aug. 1, 2022, which are hereby incorporated by reference herein in their entireties.

BACKGROUND

This relates generally to electronic devices, and, more particularly, to electronic devices with displays.

Electronic devices often include displays. For example, an electronic device may have a liquid crystal display (LCD) based on liquid crystal display pixels or an organic light-emitting diode (OLED) display based on organic light-emitting diode pixels. Head-mounted displays such as virtual reality glasses use lenses. If care is not taken, the lenses may cause distortion in an image viewed through the lenses.

SUMMARY

An electronic device may have a display such as a liquid crystal display or an organic light-emitting diode display. The display may have a display panel with an array of display pixels. The display pixels may include pixels that emit different colors of light such as red pixels, green pixels, and blue pixels.

Light from the display panel may be focused by a lens assembly towards a viewer. If care is not taken, the presence of the lens assembly may cause geometric distortion for a viewer viewing images on the display through the lens assembly. To mitigate geometric distortion, geometric distortion compensation may be performed in the electronic device. Geometric distortion compensation reduces eye fatigue, improves visual comfort, mitigates chromatic aberration, mitigates geometric distortion, and improves content registration in a pass-through mode. Geometric distortion compensation may include distorting images on the display panel such that the images viewed by the viewer through the lens assembly are not distorted. Dynamic geometric distortion compensation that accounts for the position and/or gaze direction of a viewer's eyes may be performed during the operation of the device.

The electronic device may include both a fixed lens element and a removable lens element in the lens assembly. The removable lens element may, for example, compensate for a user's eyeglasses prescription. The removable lens element may be changed, allowing the distortion function associated with the lens assembly to change over time.

To effectively compensate for geometric distortion caused by the lens assembly, both the distortion from the fixed lens element and the removable lens element must be accounted for. To dynamically compensate for geometric distortion caused by a lens assembly with a removable lens, ray tracing may be used to determine the geometric distortion caused by the lens assembly depending upon the particular removable lens that is present in the lens assembly.

Dynamic distortion compensation based on the position and/or gaze direction of a viewer's eyes may only be performed if the presence and/or properties of the removable lens element are determined with sufficient confidence.

DETAILED DESCRIPTION

Figure 1:
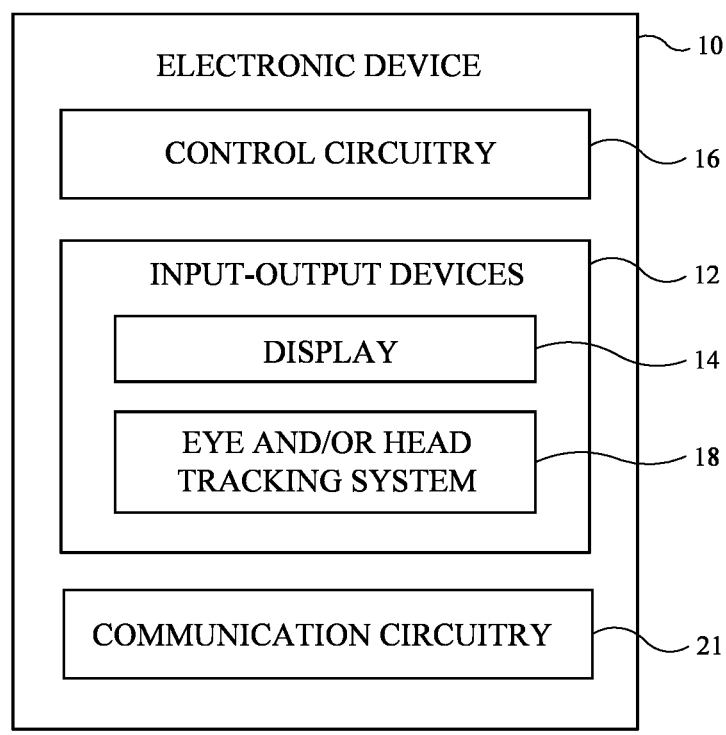
FIG. 1 is a schematic diagram of an illustrative electronic device having a display in accordance with some embodiments.

An illustrative electronic device of the type that may be provided with a display is shown in FIG. 1. Electronic device 10 may be a computing device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a display, a computer display that contains an embedded computer, a computer display that does not contain an embedded computer, a gaming device, a navigation device, an embedded system such as a system in which electronic equipment with a display is mounted in a kiosk or automobile, or other electronic equipment. Electronic device 10 may have the shape of a pair of eyeglasses (e.g., supporting frames), may form a housing having a helmet shape, or may have other configurations to help in mounting and securing the components of one or more displays on the head or near the eye of a user. As examples, electronic device 10 may be an augmented reality (AR) headset and/or virtual reality (VR) headset.

As shown in FIG. 1, electronic device 10 may include control circuitry 16 for supporting the operation of device 10. The control circuitry may include storage such as hard disk drive storage, nonvolatile memory (e.g., flash memory or other electrically-programmable-read-only memory configured to form a solid-state drive), volatile memory (e.g., static or dynamic random-access memory), etc. Processing circuitry in control circuitry 16 may be used to control the operation of device 10. The processing circuitry may be based on one or more microprocessors, microcontrollers, digital signal processors, baseband processors, power management units, audio chips, application specific integrated circuits, etc.

Input-output circuitry in device 10 such as input-output devices 12 may be used to allow data to be supplied to device 10 and to allow data to be provided from device 10 to external devices. Input-output devices 12 may include buttons, joysticks, scrolling wheels, touch pads, keypads, keyboards, microphones, speakers, tone generators, vibrators, cameras, sensors, light-emitting diodes and other status indicators, data ports, etc. A user can control the operation of device 10 by supplying commands through input-output devices 12 and may receive status information and other output from device 10 using the output resources of input-output devices 12.

Input-output devices 12 may include one or more displays such as display 14. Display 14 may be a touch screen display that includes a touch sensor for gathering touch input from a user or display 14 may be insensitive to touch. A touch sensor for display 14 may be based on an array of capacitive touch sensor electrodes, acoustic touch sensor structures, resistive touch components, force-based touch sensor structures, a light-based touch sensor, or other suitable touch sensor arrangements. A touch sensor for display 14 may be formed from electrodes formed on a common display substrate with the pixels of display 14 or may be formed from a separate touch sensor panel that overlaps the pixels of display 14. If desired, display 14 may be insensitive to touch (i.e., the touch sensor may be omitted). Display 14 in electronic device 10 may be a head-up display that can be viewed without requiring users to look away from a typical viewpoint or may be a head-mounted display that is incorporated into a device that is worn on a user's head. If desired, display 14 may also be a holographic display used to display holograms.

Control circuitry 16 may be used to run software on device 10 such as operating system code and applications. During operation of device 10, the software running on control circuitry 16 may display images on display 14.

Device 10 may include cameras and other components that form part of eye and/or head tracking system 18. The camera(s) or other components of system 18 may face an expected location for a viewer and may track the viewer's eyes and/or head (e.g., images and other information captured by system 18 may be analyzed by control circuitry 16 to determine the location of the viewer's eyes and/or head). Eye and/or head tracking system 18 may include any desired number/combination of infrared and/or visible light detectors. Eye and/or head tracking system 18 may optionally include light emitters to illuminate the scene.

In addition to determining the position of the viewer's eyes, eye and/or head tracking system 18 may determine the gaze direction of the viewer's eyes. Eye and/or head tracking system 18 may include a camera and/or other gaze-tracking system components (e.g., light sources that emit beams of light so that reflections of the beams from a user's eyes may be detected) to monitor the user's eyes. One or more gaze-tracker(s) in system 18 may face a user's eyes and may track a user's gaze. A camera in the gaze-tracking system may determine the location of a user's eyes (e.g., the centers of the user's pupils), may determine the direction in which the user's eyes are oriented (the direction of the user's gaze), may determine the user's pupil size (e.g., so that light modulation and/or other optical parameters and/or the amount of gradualness with which one or more of these parameters is spatially adjusted and/or the area in which one or more of these optical parameters is adjusted based on the pupil size), may be used in monitoring the current focus of the lenses in the user's eyes (e.g., whether the user is focusing in the near field or far field, which may be used to assess whether a user is day dreaming or is thinking strategically or tactically), and/or may determine other gaze information. Cameras in the gaze-tracking system may sometimes be referred to as inward-facing cameras, gaze-detection cameras, eye-tracking cameras, gaze-tracking cameras, or eye-monitoring cameras. If desired, other types of image sensors (e.g., infrared and/or visible light-emitting diodes and light detectors, etc.) may also be used in monitoring a user's gaze.

The example of using an optical component (e.g., camera or image sensor) in the eye and/or head tracking system 18 is merely illustrative. If desired information from one or more additional (non-optical) components may also or instead be used in eye and/or head tracking system 18. For example, eye and/or head tracking system 18 may include electromyogram-based eye tracking components.

To support communications between device 10 and external equipment, control circuitry 16 may communicate using communications circuitry 21. Circuitry 21 may include antennas, radio-frequency transceiver circuitry, and other wireless communications circuitry and/or wired communications circuitry. Circuitry 21, which may sometimes be referred to as control circuitry and/or control and communications circuitry, may support bidirectional wireless communications between device 10 and external equipment over a wireless link (e.g., circuitry 21 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link). Wireless communications may, for example, be supported over a Bluetooth® link, a WiFi® link, a 60 GHz link or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Figure 2:
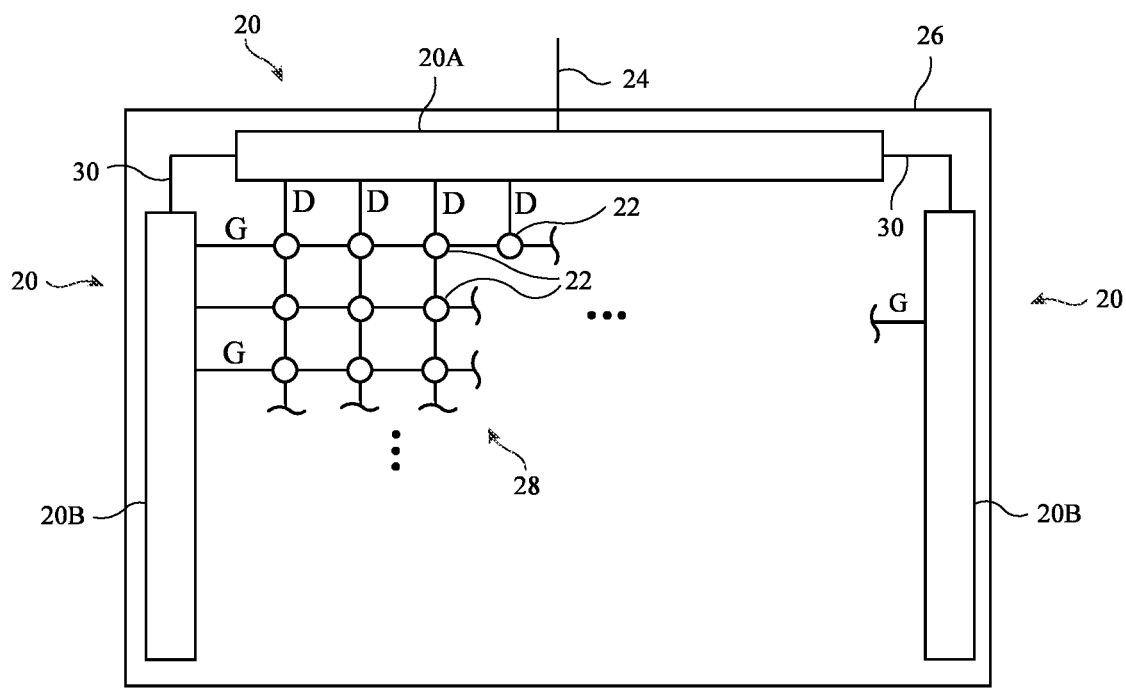
FIG. 2 is a schematic diagram of an illustrative display in accordance with some embodiments.

FIG. 2 is a diagram of an illustrative display. As shown in FIG. 2, display 14 may include layers such as substrate layer 26. Substrate layers such as layer 26 may be formed from rectangular planar layers of material or layers of material with other shapes (e.g., circular shapes or other shapes with one or more curved and/or straight edges). The substrate layers of display 14 may include glass layers, polymer layers, silicon layers, composite films that include polymer and inorganic materials, metallic foils, etc.

Display 14 may have an array of pixels 22 for displaying images for a user such as pixel array 28. Pixels 22 in array 28 may be arranged in rows and columns. The edges of array 28 may be straight or curved (i.e., each row of pixels 22 and/or each column of pixels 22 in array 28 may have the same length or may have a different length). There may be any suitable number of rows and columns in array 28 (e.g., ten or more, one hundred or more, or one thousand or more, etc.). Display 14 may include pixels 22 of different colors. As an example, display 14 may include red pixels, green pixels, and blue pixels.

Display driver circuitry 20 may be used to control the operation of pixels 28. Display driver circuitry 20 may be formed from integrated circuits, thin-film transistor circuits, and/or other suitable circuitry. Illustrative display driver circuitry 20 of FIG. 2 includes display driver circuitry 20A and additional display driver circuitry such as gate driver circuitry 20B. Gate driver circuitry 20B may be formed along one or more edges of display 14. For example, gate driver circuitry 20B may be arranged along the left and right sides of display 14 as shown in FIG. 2.

As shown in FIG. 2, display driver circuitry 20A (e.g., one or more display driver integrated circuits, thin-film transistor circuitry, etc.) may contain communications circuitry for communicating with system control circuitry over signal path 24. Path 24 may be formed from traces on a flexible printed circuit or other cable. The control circuitry may be located on one or more printed circuits in electronic device 10. During operation, control circuitry (e.g., control circuitry 16 of FIG. 1) may supply circuitry such as a display driver integrated circuit in circuitry 20 with image data for images to be displayed on display 14. Display driver circuitry 20A of FIG. 2 is located at the top of display 14. This is merely illustrative. Display driver circuitry 20A may be located at both the top and bottom of display 14 or in other portions of device 10.

To display the images on pixels 22, display driver circuitry 20A may supply corresponding image data to data lines D while issuing control signals to supporting display driver circuitry such as gate driver circuitry 20B over signal paths 30. With the illustrative arrangement of FIG. 2, data lines D run vertically through display 14 and are associated with respective columns of pixels 22.

Gate driver circuitry 20B (sometimes referred to as gate line driver circuitry or horizontal control signal circuitry) may be implemented using one or more integrated circuits and/or may be implemented using thin-film transistor circuitry on substrate 26. Horizontal control lines G (sometimes referred to as gate lines, scan lines, emission control lines, etc.) run horizontally through display 14. Each gate line G is associated with a respective row of pixels 22. If desired, there may be multiple horizontal control lines such as gate lines G associated with each row of pixels. Individually controlled and/or global signal paths in display 14 may also be used to distribute other signals (e.g., power supply signals, etc.).

Gate driver circuitry 20B may assert control signals on the gate lines G in display 14. For example, gate driver circuitry 20B may receive clock signals and other control signals from circuitry 20A on paths 30 and may, in response to the received signals, assert a gate line signal on gate lines G in sequence, starting with the gate line signal G in the first row of pixels 22 in array 28. As each gate line is asserted, data from data lines D may be loaded into a corresponding row of pixels. In this way, control circuitry such as display driver circuitry 20A and 20B may provide pixels 22 with signals that direct pixels 22 to display a desired image on display 14. Each pixel 22 may have a light-emitting diode and circuitry (e.g., thin-film circuitry on substrate 26) that responds to the control and data signals from display driver circuitry 20.

Gate driver circuitry 20B may include blocks of gate driver circuitry such as gate driver row blocks. Each gate driver row block may include circuitry such output buffers and other output driver circuitry, register circuits (e.g., registers that can be chained together to form a shift register), and signal lines, power lines, and other interconnects. Each gate driver row block may supply one or more gate signals to one or more respective gate lines in a corresponding row of the pixels of the array of pixels in the active area of display 14.

Display 14 for device 10 may be a liquid crystal display, an organic light-emitting diode display, an electrophoretic display, a plasma display, an electrowetting display, a display formed using other display technologies, or a display that uses two or more of these display technologies in a hybrid configuration.

Figure 3:
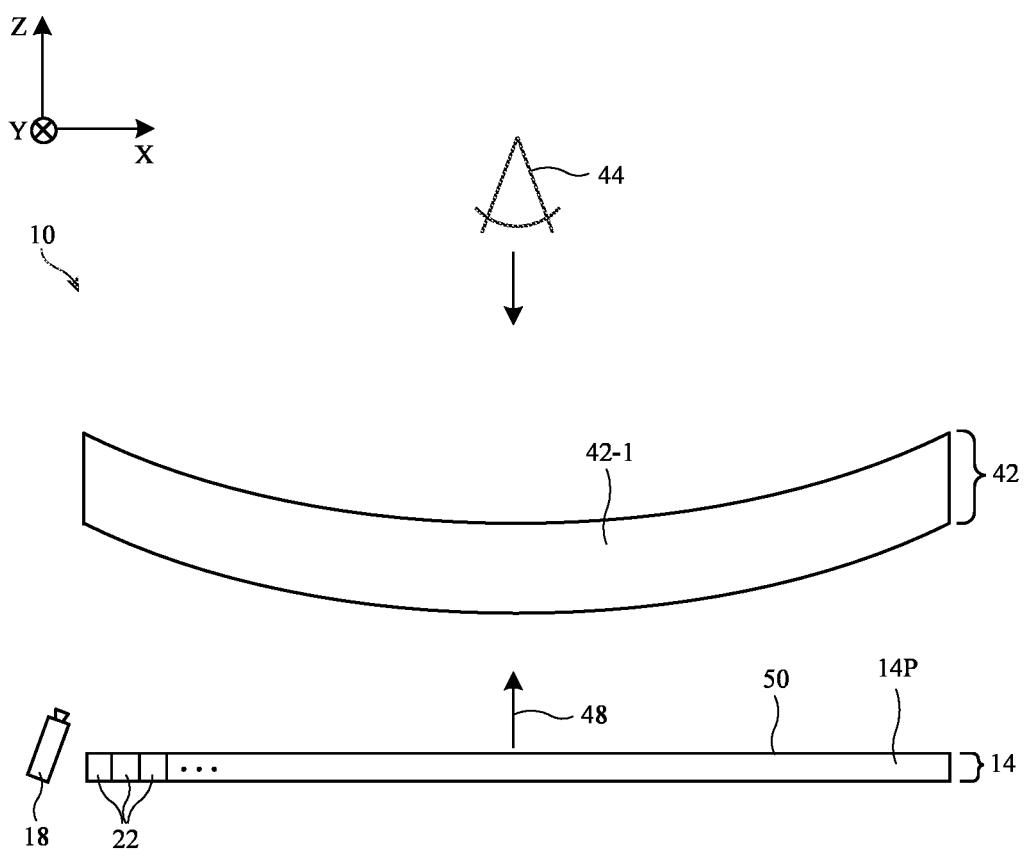
FIG. 3 is a cross-sectional side view of an illustrative device having a display and a lens assembly in accordance with some embodiments.

FIG. 3 is cross-sectional side view of an illustrative electronic device that includes a display and one or more lens elements. As shown in FIG. 3, lens assembly 42 (sometimes referred to as lens module 42) is included in device 10 in addition to display 14. The lens assembly may optionally be a catadioptric lens assembly (e.g., a lens assembly that both reflects and refracts incident light). The lens assembly may include a lens element such as lens element 42-1. Lens assembly 42 may focus light towards viewer 44 (who may view the display in the negative Z-direction in FIG. 3).

There are many possible arrangements for lens assembly 42. In general, the lens assembly may include one lens element, two lens elements, three elements, more than three elements, etc. Each lens element may have any desired combination of convex surfaces and concave surfaces. The convex and concave surfaces may be spherical, aspherical, cylindrical, or have any other desired curvature. The lens assembly may include other optical layers such as one or more linear polarizers, one or more quarter waveplates, one or more partial mirrors, one or more reflective polarizers, etc.

As previously mentioned, lens assembly 42 may be a catadioptric lens assembly. However, this need not be the case. The lens assembly may instead be a refractive lens assembly, may use one or more Fresnel lenses, etc.

As shown in FIG. 3, display 14 may include a display panel 14P. Display panel 14P may include an array of display pixels 22 similar to as shown in FIG. 2. The display panel may be an organic light-emitting diode display panel, a liquid crystal display panel, or a display panel including pixels formed from any other desired type of display technology. Display panel 14P may emit light in direction 48 in FIG. 3. Direction 48 may be parallel to the Z-axis. In other words, the chief ray angle of light emitted from the display may be orthogonal to the front surface 50 of the display panel.

As shown in FIG. 3, eye and/or head tracking system 18 may be included adjacent to display 14 and may capture images of viewer 44 during operation of device 10.

Figure 4A:
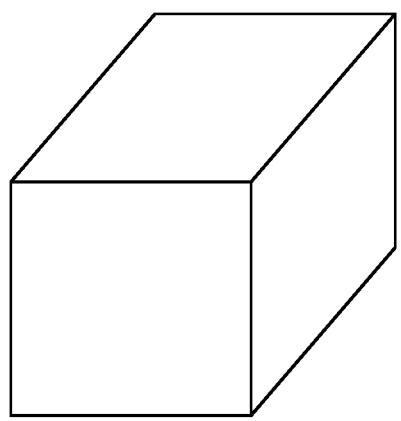
FIG. 4A is a perspective view of an illustrative image that is displayed on the display in the device of FIG. 3 in accordance with some embodiments.
Figure 4B:
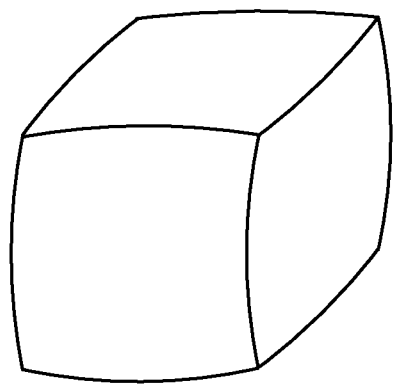
FIG. 4B is a perspective view of the illustrative image from FIG. 4A and the corresponding geometric distortion when viewed through the lens assembly in accordance with some embodiments.

If care is not taken, the presence of lens assembly 42 may cause geometric distortion for viewer 44 viewing images on display 14 through lens assembly 42. Geometric distortion refers to the improper positioning of points on in a distorted image relative to where they would be in a distortion-free system. FIGS. 4A and 4B show an example of geometric distortion. FIG. 4A is an image that is displayed on display panel 14P. FIG. 4B is the image from FIG. 4A as perceived by a viewer 44 viewing the image through lens assembly 42. As shown in FIG. 4A, the image on display panel 14P is a cube. However, as shown in FIG. 4B, when viewed through lens assembly 42, the cube appears distorted (with one or more curved edges instead of linear edges as in FIG. 4A). It is desirable to mitigate this type of geometric distortion in device 10.

To mitigate geometric distortion, geometric distortion compensation may be performed in device 10. Geometric distortion compensation reduces eye fatigue, improves visual comfort, mitigates chromatic aberration, mitigates geometric distortion, and improves content registration in a pass-through mode.

Figure 5A:
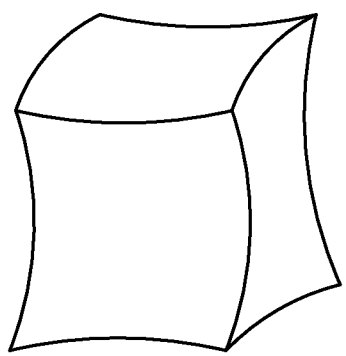
FIG. 5A is a perspective view of an illustrative compensated image that is displayed on the display in the device of FIG. 3 in accordance with some embodiments.
Figure 5B:
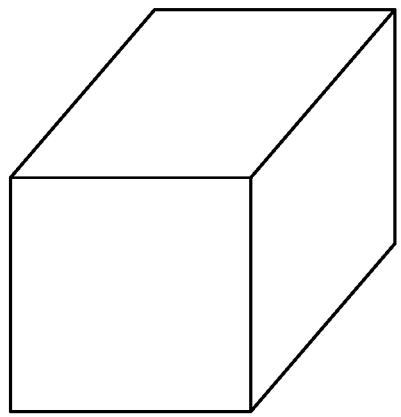
FIG. 5B is a perspective view of the illustrative image from FIG. 5A when viewed through the lens assembly in accordance with some embodiments.

Geometric distortion compensation may include distorting images on display panel 14P such that the images viewed by the viewer through lens assembly 42 are not distorted. FIGS. 5A and 5B show an example of geometric distortion compensation. FIG. 5A is an image that is displayed on display panel 14P. FIG. 5B is the image from FIG. 5A as perceived by a viewer 44 viewing the image through lens assembly 42. As shown in FIG. 5A, the image on display panel 14P is a distorted cube with one or more curved edges. However, when viewed through lens assembly 42, the cube is no longer distorted and has linear edges. The cube has the desired appearance in FIG. 5B despite the geometric distortion caused by lens assembly 42.

The geometric distortion caused by lens assembly 42 is a function of the position of the viewer's eye with respect to the lens assembly and the direction of the viewer's gaze. In other words, the geometric distortion caused by lens assembly 42 varies depending on the position and gaze direction of the viewer's eyes. If care is not taken, the geometric distortion compensation may not sufficiently account for the varying position and gaze direction of the viewer.

Figure 6A:
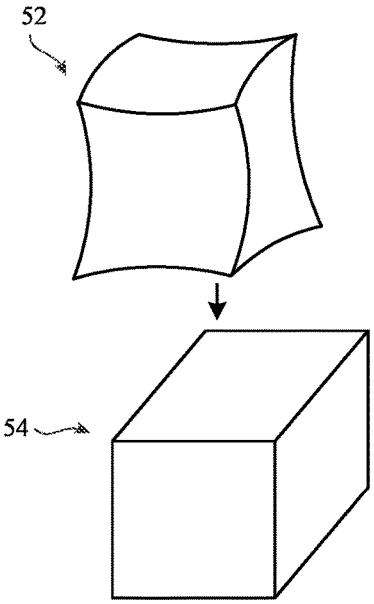
FIGS. 6A-6C show an illustrative static geometric distortion compensation scheme at various eye positions for the viewer in accordance with some embodiments.
Figure 6B:
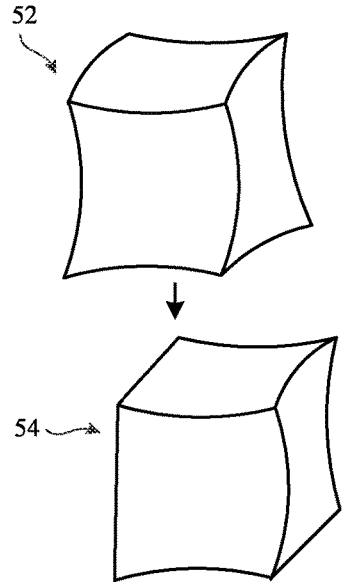
Figure 6C:
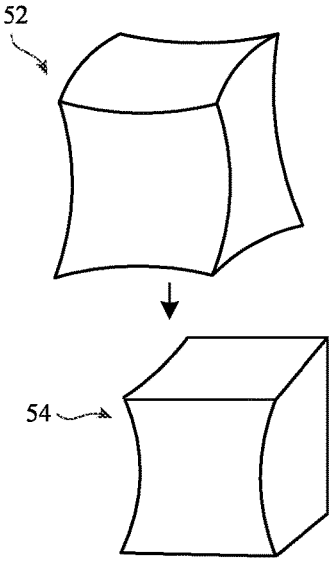

Consider an example in which static geometric distortion compensation is used in device 10. In static geometric distortion compensation, the geometric distortion compensation applied to images on display 14 may be the same regardless of the user's eye position and gaze direction. This results in geometric distortion being correctly compensated at some user eye positions but not at other eye positions. FIGS. 6A-6C show a static geometric distortion compensation scheme at various eye positions for the viewer. In each one of FIGS. 6A-6C, the upper image 52 is displayed on the display panel and the lower image 54 is the image perceived by the viewer when viewing image 52 through the lens assembly. FIG. 6A shows the effect of the distortion compensation from a first eye position (and/or gaze direction), FIG. 6B shows the effect of the distortion compensation from a second eye position (and/or gaze direction) that is different than the first eye position, and FIG. 6C shows the effect of the distortion compensation from a third eye position (and/or gaze direction) that is different than the first and second eye positions.

As shown in FIG. 6A, at the first eye position the geometric distortion compensation may properly compensate for the geometric distortion caused by lens assembly 42. However, in FIGS. 6B and 6C, because the eye position is different than in FIG. 6A, the geometric distortion compensation does not properly compensate for the geometric distortion caused by lens assembly 42 and some geometric distortion is still present in the perceived images 54.

To ensure proper geometric distortion compensation regardless of the viewer's eye position and gaze direction, dynamic geometric distortion compensation may be performed. In dynamic geometric distortion compensation, the geometric distortion compensation is updated in each frame based on the detected real-time viewer eye position and/or gaze direction.

Figure 7A:
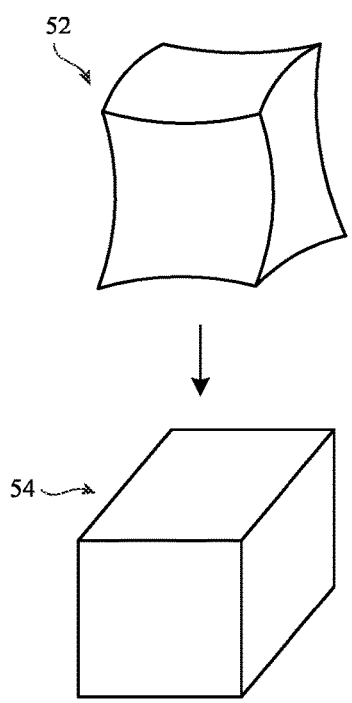
FIGS. 7A-7C show an illustrative dynamic geometric distortion compensation scheme at various eye positions for the viewer in accordance with some embodiments.
Figure 7B:
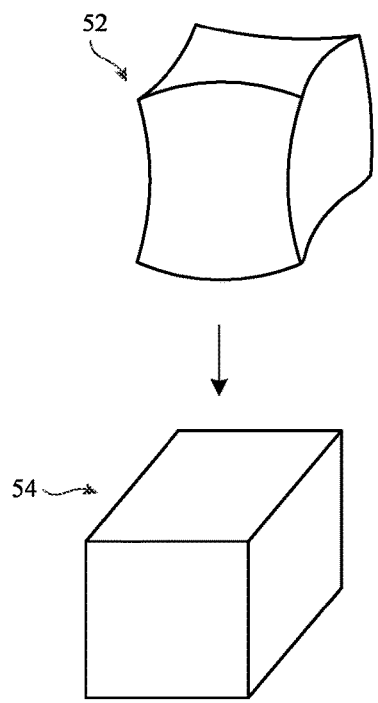
Figure 7C:
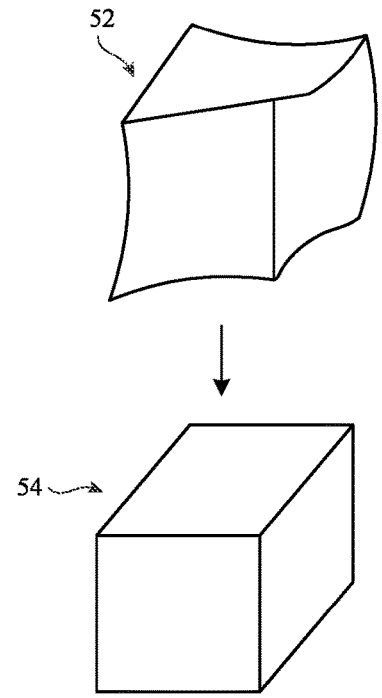

FIGS. 7A-7C show a dynamic geometric distortion compensation scheme at various eye positions for the viewer. In each one of FIGS. 7A-7C, the upper image 52 is displayed on the display panel and the lower image 54 is the image perceived by the viewer when viewing image 52 through the lens assembly. FIG. 7A shows the effect of the distortion compensation from a first eye position (and/or gaze direction), FIG. 7B shows the effect of the distortion compensation from a second eye position (and/or gaze direction) that is different than the first eye position, and FIG. 7C shows the effect of the distortion compensation from a third eye position (and/or gaze direction) that is different than the first and second eye positions.

As shown in FIGS. 7A-7C, different images 52 are displayed on the display depending on the viewer's eye position and/or gaze direction. However, the images compensate for the geometric distortion at that particular eye position and gaze direction. Therefore, at first, second, and third eye positions the geometric distortion compensation properly compensates for the geometric distortion caused by lens assembly 42. The cube has the desired appearance at all of the eye positions in FIGS. 7A-7C.

Figure 8:
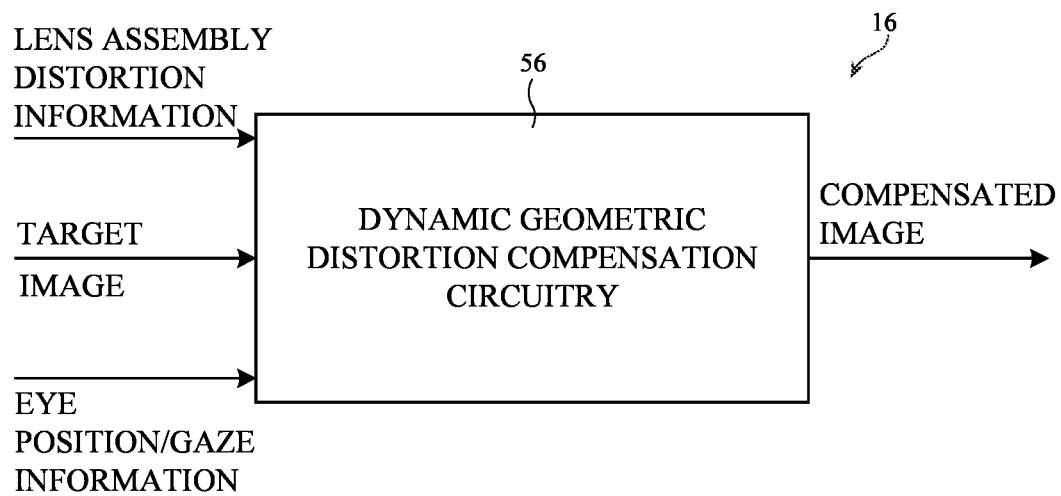
FIG. 8 is a schematic diagram showing illustrative control circuitry with dynamic geometric distortion compensation circuitry that outputs a compensated image based on lens assembly distortion information, a target image, and eye position and/or gaze information in accordance with some embodiments.

FIG. 8 is a schematic diagram showing how control circuitry 16 in device 10 may include dynamic geometric distortion compensation circuitry 56. The dynamic geometric distortion compensation circuitry may perform dynamic geometric distortion compensation based on lens assembly distortion information, a target image, and eye position and/or gaze information. The target image may be the image that is intended to be viewed by the viewer. To compensate the target image, circuitry 56 uses lens assembly distortion information and the eye position and/or gaze information.

The lens assembly distortion information (sometimes referred to as lens module distortion information) may be a characterization of the distortion light field caused by lens assembly 42 (e.g., lens assembly 42 in FIG. 3). During calibration operations (e.g., during manufacturing), the distortion light field may be measured across the area where a viewer's eye is expected to be present. The distortion light field $\vec{\lambda}$ may be characterized by the equation $\vec{u} = \vec{\lambda}(\vec{p}, \vec{\theta})$, where $\vec{p}$ is the position of the viewer's pupil in three-dimensional space within the eye box, $\vec{\theta}$ is the two-dimensional projected angle at position $\vec{p}$, and $\vec{u}$ is the corresponding position on the display panel (e.g., the pixel in the display panel that emits the light).

The lens assembly distortion information received by dynamic geometric distortion compensation circuitry 56 may include a distortion light field $\vec{\lambda}$ and/or may include a distortion function $\vec{D}$. The distortion function $\vec{D}$ may be used by dynamic geometric distortion compensation circuitry 56 to generate a warp lookup table that is used to compensate the target image. The distortion function $\vec{D}$ is characterized by the equation $\vec{u}=\vec{D}(\vec{p},\vec{\theta})$. The distortion function $\vec{D}$ may also itself be referred to as a warp lookup table. Ultimately, the warp lookup table may include information capturing the displacement between each pixel on the target image and a respective pixel on the display panel.

During operation of device 10, dynamic geometric distortion compensation circuitry may receive eye position and/or gaze direction information (e.g., from eye and/or head tracking system 18 in FIG. 1). The eye position information may be used to determine the warp lookup table for the compensation process. In other words, $\vec{p}$ (the position in three-dimensional space within the eyebox) is determined using the received eye position information.

Consider an example where the target image for a first frame has a first pixel at row 1, column 1 with a first target brightness. Dynamic geometric distortion compensation circuitry 56 may use the eye position information and lens assembly distortion information to determine a warp lookup table (sometimes referred to as distortion table) for the first frame. The warp lookup table may be used to determine that the pixel at row 3, column 3 in the display panel should have the first target brightness in the first frame.

At a later time, for a second frame, the user's eye position may have changed. The target image for the second frame is the same as the target image for the first frame. Therefore, the target image for the first frame has the first pixel at row 1, column 1 with the first target brightness. However, the new eye position information (and the lens assembly distortion information) is used to determine a different warp lookup table for the second frame. The warp lookup table may be used to determine that the pixel at row 4, column 2 in the display panel should have the first target brightness in the second frame.

To summarize, the lens assembly distortion information and eye position information may be used in real time to compensate a target image for geometric distortion. The lens assembly distortion information may be determined during calibration operations (e.g., during manufacturing). The eye position information, meanwhile, is received from an eye and/or head tracking system 18 within device 10. Dynamic geometric distortion compensation circuitry 56 outputs a compensated image that is provided to the display driver circuitry (e.g., circuitry 20 in FIG. 2) for display on display 14.

Device 10 in FIG. 3 has a lens assembly 42 that is fixed during operation of the device. In other words, the distortion function associated with lens assembly 42 in FIG. 3 does not change over time. However, this example for device 10 is merely illustrative. In another possible arrangement, device 10 may include a removable lens element in lens assembly 42. This allows the distortion function associated with lens assembly 42 to change over time, increasing the complexity of dynamic geometric distortion compensation operations.

Figure 9:
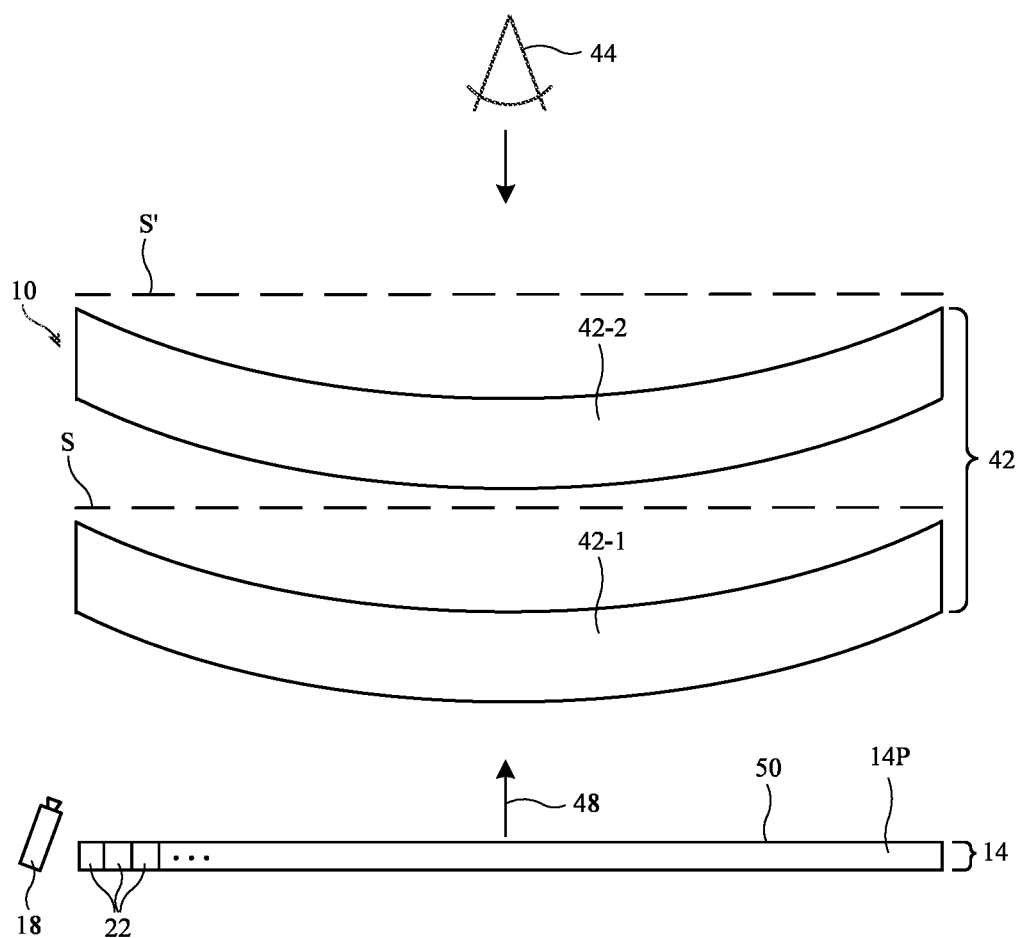
FIG. 9 is a cross-sectional side view of an illustrative device having a display and a lens assembly with a removable lens element in accordance with some embodiments.

FIG. 9 is cross-sectional side view of an illustrative electronic device that includes a display and one or more lens elements. As shown in FIG. 9, lens assembly 42 is included in device 10 in addition to display 14. The lens assembly may optionally be a catadioptric lens assembly (e.g., a lens assembly that both reflects and refracts incident light). The lens assembly may include lens elements such as lens elements 42-1 and 42-2. Lens assembly 42 may focus light towards viewer 44 (who may view the display in the negative Z-direction in FIG. 9).

There are many possible arrangements for lens assembly 42. In general, the lens assembly may include one lens element, two lens elements, three lens elements, more than three elements, etc. Each lens element may have any desired combination of convex surfaces and concave surfaces. The convex and concave surfaces may be spherical, aspherical, cylindrical, or have any other desired curvature. The lens assembly may include other optical layers such as one or more linear polarizers, one or more quarter waveplates, one or more partial mirrors, one or more reflective polarizers, etc.

As previously mentioned, lens assembly 42 may be a catadioptric lens assembly. However, this need not be the case. The lens assembly may instead be a refractive lens assembly, may use one or more Fresnel lenses, etc.

As shown in FIG. 9, eye and/or head tracking system 18 may be included adjacent to display 14 and may capture images of viewer 44 during operation of device 10.

Lens element 42-2 in lens assembly 42 may be a removable lens element. In other words, a user may be able to easily remove and replace lens element 42-2 within lens assembly 42. This may allow lens element 42-2 to be customizable. If lens element 42-2 is permanently affixed to the optical system, the lens power provided by lens element 42-2 cannot be easily changed. However, by making lens element 42-2 customizable, a user may select a lens element 42-2 that best suits their eyes and place the appropriate lens element 42-2 in the lens assembly. The lens element 42-2 may be used to accommodate a user's glasses prescription, for example. A user may replace lens element 42-2 with a different removable lens element if their glasses prescription changes (without needing to replace any of the other components within device 10).

In contrast with lens element 42-2, lens element 42-1 may not be a removable lens element. Lens element 42-1 may therefore be referred to as a permanent lens element, a fixed lens element, or a non-removable lens element. The example of lens element 42-1 being a non-removable lens element is merely illustrative. In another possible arrangement, lens element 42-1 may also be a removable lens element (similar to lens element 42-2). In general, any lens element within lens assembly 42 may optionally be removable.

To effectively compensate for geometric distortion caused by lens assembly 42 in FIG. 9, both the distortion from lens element 42-1 and lens element 42-2 must be accounted for. However, device 10 may be compatible with a high number of removable lenses 42-2 (e.g., more than ten, more than fifty, more than one hundred, etc.). Determining and storing a full distortion light field (or distortion function) for each possible lens assembly 42 (including every possible removable lens 42-2 that may be included in the lens assembly) therefore may not be practical given storage and/or time constraints.

To dynamically compensate for geometric distortion caused by lens assembly 42 with a removable lens 42-2, ray tracing may be used to determine the geometric distortion caused by lens assembly 42 depending upon the particular removable lens 42-2 that is present in the lens assembly.

Figure 10:
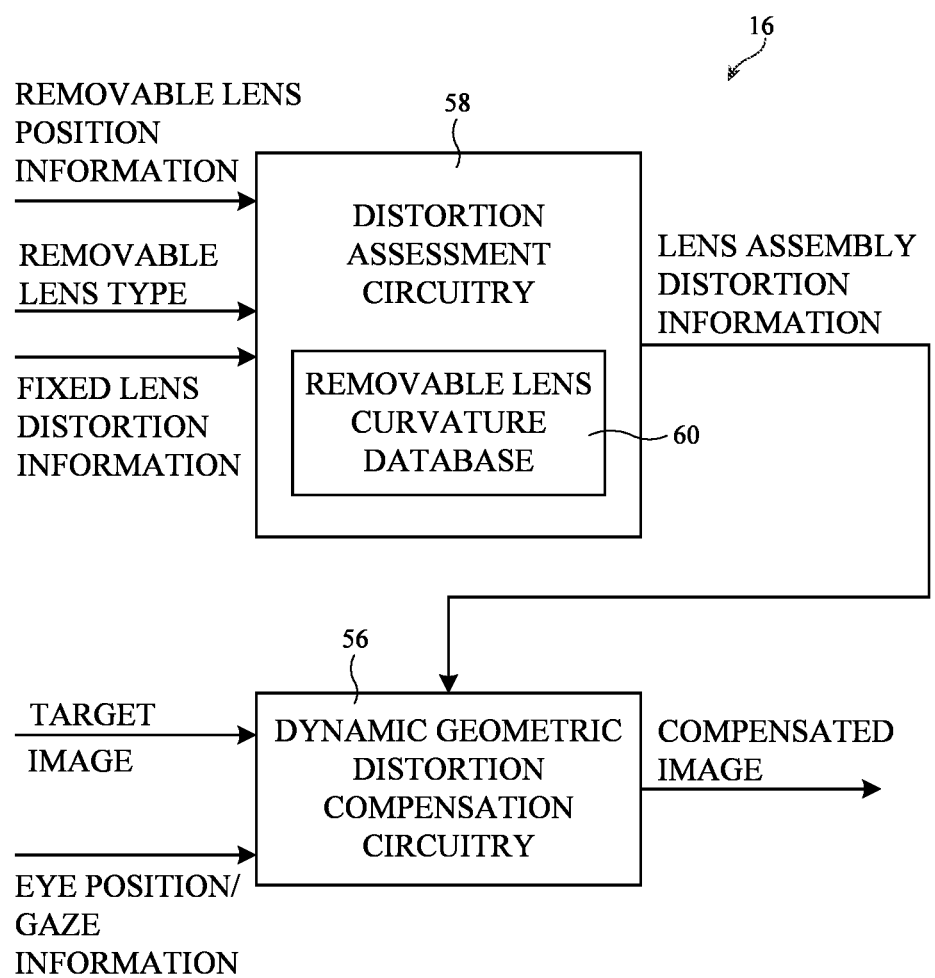
FIG. 10 is a schematic diagram showing illustrative control circuitry with distortion assessment circuitry that outputs lens assembly distortion information based on removable lens position information, a removable lens type, and fixed lens distortion information in accordance with some embodiments.

FIG. 10 is a schematic diagram showing how control circuitry 16 in device 10 may include distortion assessment circuitry 58 in addition to dynamic geometric distortion compensation circuitry 56. Distortion assessment circuitry 58 may determine lens assembly distortion information based on the type of removable lens included in the lens assembly.

As shown in FIG. 10, distortion assessment circuitry 58 may receive removable lens position information, the removable lens type, and fixed lens distortion information. The removable lens position information may be obtained by eye and/or head tracking system 18. Eye and/or head tracking system 18 includes one or more cameras directed towards viewer 44 to determine the position of the viewer's eyes. One of these cameras may also capture images of lens element 42-2 (and/or lens element 42-1). Using the captured images, the position and orientation of lens element 42-2 relative to lens 42-1 may be determined.

Each removable lens 42-2 that is compatible with device 10 may include one or more embedded optical markers that are detectable to eye and/or head tracking system 18. The embedded optical markers may be used to precisely determine the position and orientation of removable lens 42-2. The optical markers may optionally be invisible or difficult to detect to the human eye (to minimize disruption to the viewer caused by the optical markers). This example is merely illustrative and other techniques may be used to determine the position of removable lens 42-2 if desired.

The removable lens type may identify which compatible removable lens is present in the device. As one example, the removable lens type may be known based on user input. For example, the user uses input devices 12 to tell control circuitry 16 in device 10 which removable lens has been added to the lens assembly. As another example, the aforementioned optical marker(s) in removable lens 42-2 may be used to identify the lens type in addition to the lens position. In other words, eye and/or head tracking system 18 may be used to determine the removable lens type in addition to the removable lens position information. As another example, each removable lens 42-2 that is compatible with device 10 may include a near-field communications (NFC) tag (sometimes referred to as NFC marker) that communicates with a respective near-field communications antenna in device 10. Device 10 therefore determines the removable lens type using information from the NFC tag on the removable lens.

Regardless of how the removable lens type is determined, the distortion assessment circuitry 58 receives a removable lens type that identifies the removable lens 42-2 present in the lens assembly.

The fixed lens distortion information may be a characterization of the distortion light field caused by fixed lens element 42-1 in lens assembly 42. The fixed lens distortion information may characterize the distortion caused by only fixed lens element 42-1 (and not removable lens element 42-2). During calibration operations (e.g., during manufacturing), the distortion light field caused by fixed lens element 42-1 may be measured across the fixed lens element 42-1 (without a removable lens 42-2 being present). The distortion light field $\vec{\lambda}$ may be characterized by the equation $\vec{u} = \vec{\lambda}(\vec{p}, \vec{\theta})$, where $\vec{p}$ is the position of the viewer's pupil in three-dimensional space within the eye box, $\vec{\theta}$ is the two-dimensional projected angle at position $\vec{p}$, and $\vec{u}$ is the corresponding position on the display panel.

The fixed lens distortion information received by distortion assessment circuitry 58 may include a distortion light field $\vec{\lambda}$ and/or a distortion function $\vec{D}$ that characterizes the geometric distortion caused by fixed lens element 42-1 in the lens assembly. The distortion function $\vec{D}$ is characterized by the equation $\vec{u} = \vec{D}(\vec{p}, \vec{\theta})$. The fixed lens distortion information (distortion light field $\vec{\lambda}$ and/or distortion function $\vec{D}$) may characterize the geometric distortion at virtual surface S in FIG. 9 (e.g., a virtual surface between fixed lens element 42-1 and removable lens element 42-2). Virtual surface S may be planar (as in FIG. 9) or curved.

Next, distortion assessment circuitry 58 may perform ray tracing from the virtual surface S (between lens elements 42-1 and 42-2) through lens element 42-2 to a second virtual surface S' (on the eye-side of the removable lens element 42-2). Lens element 42-2 is interposed between the first virtual surface S and the second virtual surface S'. To perform the ray tracing, the distortion assessment circuitry 58 uses the distortion light field $\vec{\lambda}$ for surface S (either received directly from fixed lens distortion information or derived from a distortion function $\vec{D}$ that is received from the fixed lens distortion information) and a removable lens model that is obtained from a database 60 stored in circuitry 58.

Database 60 may include information regarding the curvature of each removable lens that is compatible with device 10. The database may, for example, be a look-up table with a plurality of entries that each have a removable lens type and corresponding curvature for that removable lens type. The known removable lens type received by distortion assessment circuitry 58 is used to look up the curvature of that removable lens type. Thus, the curvature of the removable lens type that is present in the lens assembly is determined.

To populate database 60, the curvature of each compatible removable lens 42-2 may be measured (e.g., during manufacturing). The curvature of each compatible removable lens is then stored on a database 60 that is included in distortion assessment circuitry 58.

The removable lens position information received by distortion assessment circuitry 58 is used to determine the position of the removable lens relative to the fixed lens element. The curvature (determined from database 60) and position information are used by distortion assessment circuitry 58 to model (using ray tracing) the distortion light field $\vec{\lambda}$ at surface S passing through removable lens element 42-2 from surface S to surface S'. The resulting distortion light field $\vec{\lambda}'$ at surface S' is subsequently used to determine an overall distortion function $\vec{D}'$ that characterizes geometric distortion caused by both lens elements 42-1 and 42-2.

To summarize, the distortion assessment circuitry 58 receives removable lens position information, a type of the removable lens in the lens assembly, and distortion information for the fixed lens in the lens assembly and outputs lens assembly distortion information that accounts for distortion caused by both lenses 42-1 and 42-2. Distortion assessment circuitry 58 uses a database of curvature (shapes) for the removable lenses and a ray tracing model to determine the lens assembly distortion information.

The lens assembly distortion information is provided from distortion assessment circuitry 58 to dynamic geometric distortion compensation circuitry 56. The dynamic geometric distortion compensation circuitry 56 operates in the same manner as described in connection with FIG. 8. Therefore, the descriptions of the operation of dynamic geometric distortion compensation circuitry 56 will not be repeated here.

Figure 11:
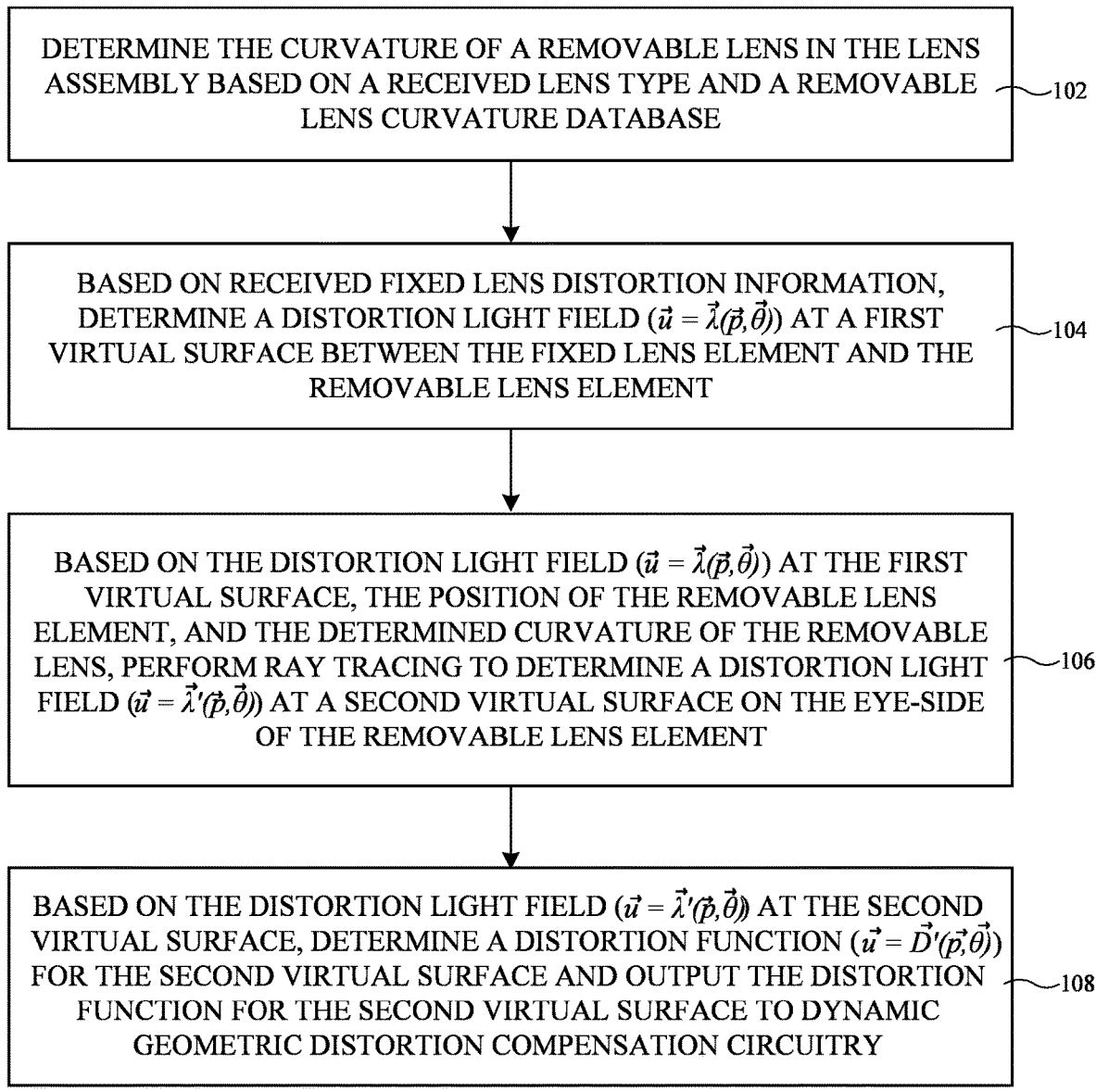
FIG. 11 is a flowchart of illustrative method steps for operating the distortion assessment circuitry of FIG. 10 in accordance with some embodiments.

FIG. 11 is a flowchart of illustrative method steps performed by distortion assessment circuitry 58 in FIG. 10. First, at step 102, the distortion assessment circuitry 58 may determine the curvature of a removable lens in the lens assembly based on a received lens type and a stored removable lens curvature database 60. The lens type may be known in device 10 from user input, based on images captured by eye and/or head tracking system 18, based on information from an NFC tag, etc. Removable lens curvature database 60 may be stored in distortion assessment circuitry 58. The received lens type may be used to look up the corresponding removable lens curvature in database 60.

Next, at step 104, a distortion light field ($\vec{u}=\vec{\lambda}(\vec{p},\vec{\theta})$) may be determined for a first virtual surface that is interposed between fixed lens element 42-1 and removable lens element 42-2 (e.g., surface S in FIG. 9). The distortion light field $\vec{\lambda}$ for surface S may be received directly at distortion assessment circuitry 58 (e.g., the received fixed lens distortion information is the distortion light field $\vec{\lambda}$). Alternatively, the distortion light field $\vec{\lambda}$ for surface S may be derived by distortion assessment circuitry 58 when the received fixed lens distortion information is a distortion function $\vec{D}$.

At step 106, based on the distortion light field ($\vec{u}=\vec{\lambda}(\vec{p},\vec{\theta})$) at the first virtual surface (from step 104), the position of the removable lens element (received by distortion assessment circuitry 58), and the determined curvature of the removable lens (from step 102), distortion assessment circuitry 58 may perform ray tracing to determine a distortion light field ($\vec{u}=\vec{\lambda}'(\vec{p},\vec{\theta})$) at a second virtual surface on the eye-side of the removable lens element. The position of the removable lens element may be determined using eye and/or head tracking system 18 (as an example).

Finally, at step 108, based on the distortion light field ($\vec{u}=\vec{\lambda}'(\vec{p},\vec{\theta})$) at the second virtual surface (from step 106), distortion assessment circuitry 58 may determine a distortion function ($\vec{u}=\vec{D}'(\vec{p},\vec{\theta})$) for the second virtual surface and output the distortion function ($\vec{D}'$) for the second virtual surface S' (see FIG. 9) to dynamic geometric distortion compensation circuitry 56. The distortion function ($\vec{D}'$) for the second virtual surface S' may subsequently be used by dynamic geometric distortion compensation circuitry 56 to compensate for geometric distortion caused by both lens elements 42-1 and 42-2 in lens assembly 42.

It should be noted that distortion assessment circuitry 58 may be part of control circuitry 16 within device 10. Alternatively, distortion assessment circuitry 58 may be part of a cloud network that communicates with device 10 using communication circuitry 21 (see FIG. 1). In this type of arrangement, control circuitry 16 in device 10 may send a request to distortion assessment circuitry 58 in the cloud network for lens assembly distortion information along with necessary information to determine the lens assembly distortion information (e.g., the removable lens position information, removable lens type, and/or fixed lens distortion information from FIG. 10). Distortion assessment circuitry 58 in the cloud network may determine the lens assembly distortion information for lens elements 42-1 and 42-2 and send the lens assembly distortion information to communication circuitry 21 in device 10. Control circuitry 16 may then provide the received lens assembly distortion information to dynamic geometric distortion compensation circuitry 56 for real-time dynamic geometric distortion compensation operations.

Regardless of whether distortion assessment circuitry 58 is included in device 10 or part of a cloud network, distortion assessment circuitry 58 may update the lens assembly distortion information whenever the removable lens type or removable lens position changes. If neither of these factors change, dynamic geometric distortion compensation circuitry 56 can accurately perform dynamic geometric distortion compensation using the most recently received lens assembly distortion information. When either the removable lens type or removable lens position changes, distortion assessment circuitry 58 may update the lens assembly distortion information and provide the new lens assembly distortion information to dynamic geometric distortion compensation circuitry 56.

It should be noted that eyeglasses may have a corresponding geometric distortion. A viewer who is used to wearing eyeglasses may therefore be used to geometric distortion associated with those eyeglasses. When operating device 10, removable lens 42-2 may serve to compensate for the viewer's eyesight (instead of the eyeglasses). Dynamic geometric distortion compensation circuitry 56 may compensate the images on display 14 to remove geometric distortion in one embodiment. Alternatively, dynamic geometric distortion compensation circuitry 56 may compensate the images on display 14 to match the geometric distortion of the viewer's eyeglasses. In this way, the viewer may seamlessly switch between wearing their eyeglasses and viewing display 14 through lens assembly 42 without a change in perceived geometric distortion.

Figure 12:
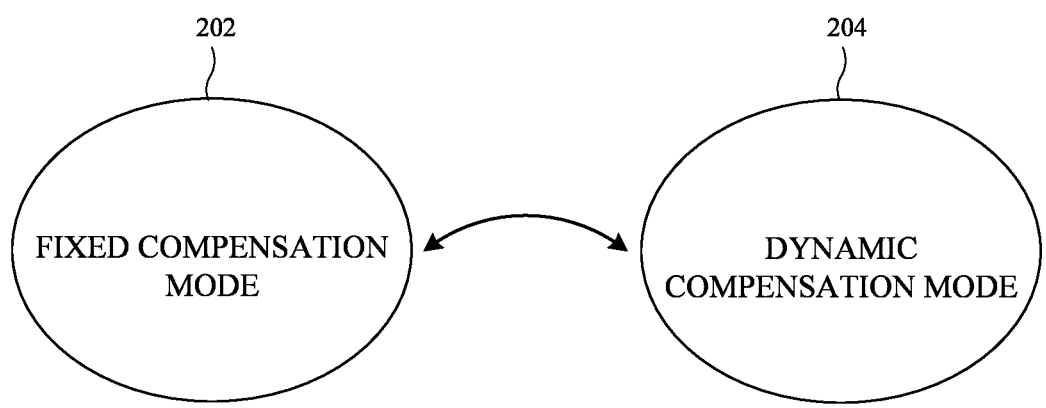
FIG. 12 is a state diagram showing how an illustrative electronic device may have a fixed compensation mode and a dynamic compensation mode in accordance with some embodiments.

Dynamic distortion compensation based on the position and/or gaze direction of a viewer's eyes (e.g., the dynamic distortion compensation shown and described in connection with FIGS. 8-11) may only be performed if the presence and/or properties of the removable lens element are determined with sufficient confidence. FIG. 12 is a state diagram showing how an illustrative electronic device (e.g., a display in the device) may have a fixed compensation mode and a dynamic compensation mode.

In fixed compensation mode 202, compensation (such as the geometric distortion compensation described herein) is applied to images on display 14. In the fixed compensation mode, the compensation is applied in the same manner regardless of the user's eye position and gaze direction. In other words, the compensation is always performed under the assumption that the eye is in a single fixed position. This results in geometric distortion being correctly compensated at some user eye positions but not at other eye positions. To achieve the best compensation possible in the fixed compensation mode, the user's eye position may be assumed to be in the center of the expected eye location (e.g., in the center of the eye box), may be estimated based on historical data regarding the user's eye position, etc. Similarly, to achieve the best compensation possible in the fixed compensation mode, the user's gaze direction may be assumed to be targeting a center of the display, may be estimated based on historical data regarding the user's gaze direction, etc. In the fixed compensation mode, temporal artifacts (potentially caused by errors in dynamic distortion compensation) are mitigated.

In dynamic compensation mode 204, compensation (such as the geometric distortion compensation described herein) is applied to images on display 14. In the dynamic compensation mode, the compensation is applied based at least in part on the user's eye position and gaze direction. In other words, the compensation is updated in real time based on the detected eye information. This results in improved geometric distortion compensation at various user eye positions and gaze directions.

Figure 13:
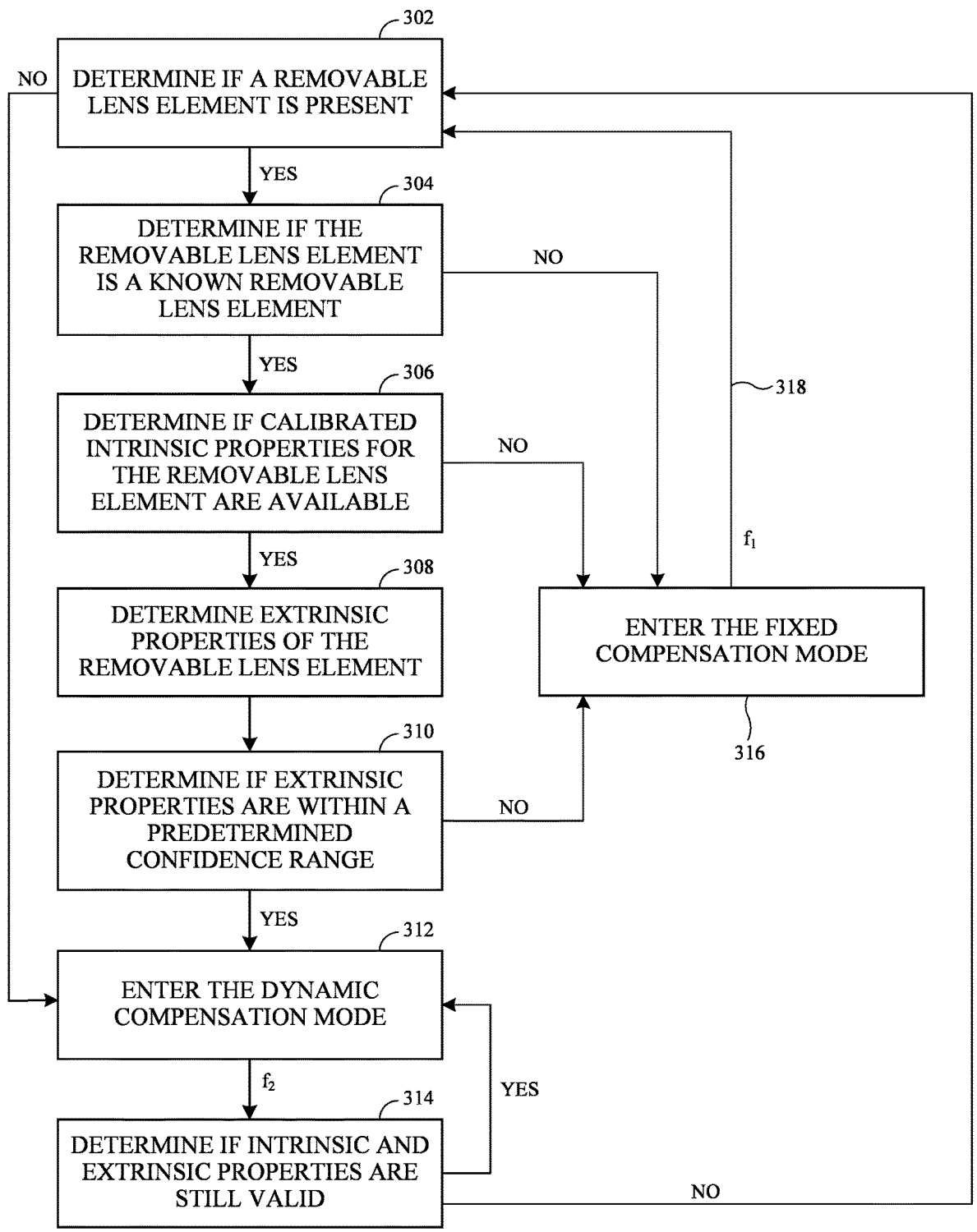
FIG. 13 is a flowchart of illustrative method steps for operating an electronic device with a fixed compensation mode and a dynamic compensation mode in accordance with some embodiments.

FIG. 13 is a flowchart of illustrative operations performed by an electronic device with a fixed compensation mode and a dynamic compensation mode. As shown, during the operations of block 302, the electronic device may determine if a removable lens element is present in lens assembly 42. As one illustrative arrangement, eye and/or head tracking system 18 may be used to determine if a removable lens element is present in the lens assembly. Eye and/or head tracking system 18 may include one or more camera(s) or other components that face an expected location for a viewer and track the viewer's eyes. Images from these cameras may be analyzed to determine when a removable lens element such as removable lens element 42-2 in FIG. 9 has been added to lens assembly 42. The analysis of images from a camera to determine whether the removable lens element is present may be performed by control circuitry 16 in display 14 and/or head and/or eye tracking system 18.

If no removable lens element is present, then the electronic device may place the display in the dynamic compensation mode (where compensation for images on the display is performed based on the eye position and/or gaze direction information from system 18) at block 312. The properties (e.g., shape, lens power, position, etc.) of permanent lens element 42-1 in lens assembly 42 may be known to the electronic device. Accordingly, the electronic device may be able to, with high confidence, determine the eye position and/or gaze direction information when no removable lens element is present (and therefore only permanent lens element 42-1 is present). Therefore, display 14 is placed in the dynamic compensation mode when it is determined that no removable lens element is present at block 302.

If a removable lens element is determined to be present at block 302, the electronic device may then determine if the removable lens element is a known removable lens element at block 304. The electronic device (e.g., control circuitry 16 in display 14, as one example) may determine if the removable lens element is a known removable lens element using user input and/or images of the removable lens element.

User input may be provided to electronic device 10 (e.g., using input-output devices 12 in FIG. 1) to identify the lens element. The user input may identify prescription information associated with the removable lens element, may identify a model number associated with the removable lens element, may identify other properties associated with the removable lens element, etc. The user input may confirm that a removable lens element currently attached to lens assembly 42 is the same as a previously identified removable lens element.

As another example, one or more cameras in electronic device 10 (optionally a camera that is part of eye and/or head tracking system 18) may capture images of the removable lens element to determine if the removable lens element is a known removable lens element. The removable lens element may optionally have one or more optical markers that are captured by the cameras and used to determine whether the removable lens element is a known removable lens element.

As yet another example, the removable lens element may have a near-field communications (NFC) tag that is read by a corresponding NFC reader in electronic device 10. Information from the NFC tag (e.g., identification information, information regarding the properties of the removable lens element, etc.) may be used to determine if the removable lens element is a known removable lens element.

If the operations of block 304 determine that the removable lens element is not a known removable lens element, the display may be placed in the fixed compensation mode at block 316. Eye and/or head tracker 18 may operate through the removable lens element to obtain eye position and gaze direction information. Therefore, when the removable lens element is not a known removable lens element, the electronic device may be unable to determine the eye position and/or gaze direction with sufficient accuracy to use dynamic compensation.

If the operations of block 304 determine that the removable lens element is a known removable lens element, the electronic device may read intrinsic properties of the removable lens element (e.g., lens power, curvature, shape, etc.) during the operations of block 306. The electronic device may store the intrinsic properties of one or more removable lens elements in memory within control circuitry 16 (as one example). If the intrinsic properties are stored in memory, the intrinsic properties may be accessed during the operations of block 306. In some instances, the intrinsic properties of the removable lens element may not be stored in memory. In these cases, the electronic device may communicate with an external device (e.g., via the internet) to attempt to download the intrinsic properties of the removable lens element.

During the operations of block 306, the electronic device (e.g., control circuitry 16 in display 14, as one example) may determine if calibrated intrinsic properties are available. As previously described, the obtained intrinsic properties of the removable lens element may include information on the lens power of the removable lens element, curvature of the removable lens element, etc. The intrinsic properties may sometimes include calibrated intrinsic properties. The calibrated intrinsic properties may be measured properties of the removable lens element that are measured during calibration operations (e.g., during manufacturing).

As a first example, a 2.0 diopter removable lens 42-2 is added to lens assembly 42. During the operations of block 306, the electronic device obtains available intrinsic properties for the identified 2.0 diopter removable lens (e.g., from memory within the device, from the internet, etc.). The available intrinsic properties identify the lens power of the removable lens and the designed shapes of the front and back surfaces of the removable lens. However, calibrated intrinsic properties for the removable lens are not available. Accordingly, the operations of block 306 may end in a determination of 'no' for this example.

As a second example, a 3.0 diopter removable lens 42-2 is added to lens assembly 42. During the operations of block 306, the electronic device obtains available intrinsic properties for the identified 3.0 diopter removable lens (e.g., from memory within the device, from the internet, etc.). The available intrinsic properties identify the lens power of the removable lens and the designed shapes of the front and back surfaces of the removable lens. The available intrinsic properties also include calibrated intrinsic properties for the removable lens. In other words, direct measurements of the manufactured surfaces of removable lens 42-2 are available. Accordingly, the operations of block 306 may end in a determination of 'yes' for this example.

If the operations of block 304 determine that the calibrated intrinsic properties for the removable lens are not available, the display may be placed in the fixed compensation mode at block 316. When the calibrated intrinsic properties for the removable lens element are not available, the electronic device may be unable to determine the eye position and/or gaze direction with sufficient accuracy to use dynamic compensation.

If the operations of block 306 determine that the calibrated intrinsic properties for the removable lens are available, the electronic device (e.g., control circuitry 16 within display 14 and/or system 18) may determine the extrinsic properties of the removable lens element during the operations of block 308.

The extrinsic properties of the removable lens element include both the position and orientation of the removable lens element. The position of the removable lens element may refer to a position within 3D space of a center of the removable lens element. The orientation of the removable lens element (sometimes referred to as pose) refers to the yaw, pitch, and roll of the removable lens element around respective axes of rotation.

As one example, the extrinsic properties may be determined using information from eye and/or head tracking system 18. Eye and/or head tracking system 18 may include one or more light emitters. Cameras in eye and/or head tracking system may capture images of light from the light emitters that reflects off of lens assembly 42 (including removable lens element 42-2). Analysis of the images from cameras in the eye and/or head tracking system 18 may be used to determine the extrinsic properties of the removable lens element.

Each removable lens 42-2 that is compatible with device 10 may include one or more embedded optical markers that are detectable to one or more cameras in device 10 (e.g., a camera in eye and/or head tracking system 18). The embedded optical markers may be used to precisely determine the extrinsic properties (position and orientation) of removable lens 42-2. The optical markers may optionally be invisible or difficult to detect to the human eye (to minimize disruption to the viewer caused by the optical markers).

The example of using information from eye and/or head tracking system 18 to determine the extrinsic properties is merely illustrative. Instead or in addition, information from one or more other cameras not in system 18, information from an NFC reader that reads a corresponding NFC tag in the removable lens element, and/or information from another sensor within electronic device 10 may be used to determine the extrinsic properties.

During the operations of block 310, the electronic device 10 (e.g., control circuitry 16 within display 14 and/or system 18) may determine if the extrinsic properties determined during block 308 are within a predetermined confidence range (e.g., determine if the extrinsic properties were successfully determined or not). If the extrinsic properties are not within a predetermined confidence range (e.g., the extrinsic properties were not successfully obtained), the display may be placed in the fixed compensation mode at block 316. When the extrinsic properties are not within a predetermined confidence range (i.e., the electronic device does not precisely know the position and/or orientation of the removable lens element), the electronic device may be unable to determine the eye position and/or gaze direction with sufficient accuracy to use dynamic compensation.

If the extrinsic properties are within the predetermined confidence range (e.g., the extrinsic properties were successfully obtained), the display may be placed in the dynamic compensation mode at block 312. When the extrinsic properties are within a predetermined confidence range (i.e., the electronic device precisely knows the position and orientation of the removable lens element), the electronic device may be able to determine the eye position and/or gaze direction with sufficient accuracy to use dynamic compensation.

In other words, the display is placed in the dynamic compensation mode if it is determined no removable lens is present (in block 302) or if it is determined that a removable lens is present (in block 302), it is determined that the removable lens element is a known removable lens element (in block 304), it is determined that the calibrated properties for the removable lens element are available (in block 306), and it is determined (in block 310) that the extrinsic properties (obtained at block 308) are within a predetermined confidence range.

When the display is operating in the fixed compensation mode (at block 316), the display may intermittently restart the procedures of FIG. 13 as indicated by loop 318. In other words, at a desired frequency $f_1$ (e.g., less than 10 Hz, 1 Hz, less than 1 Hz, less than 0.5 Hz, less than 0.1 Hz, greater than 0.1 Hz, greater than 0.5 Hz, between 0.1 Hz and 1 Hz, etc.) the electronic device restarts the operations of block 302 (as indicated by loop 318) and follows the flowchart to either stay in the fixed compensation mode or switch to the dynamic compensation mode.

When the display is operating in the dynamic compensation mode (at block 312), the display may intermittently determine if the intrinsic and extrinsic properties for the lens assembly are still valid at block 314. In other words, at a desired frequency $f_2$ (e.g., less than 10 Hz, 1 Hz, less than 1 Hz, less than 0.5 Hz, less than 0.1 Hz, greater than 0.1 Hz, greater than 0.5 Hz, between 0.1 Hz and 1 Hz, etc.) the electronic device checks the intrinsic and extrinsic properties at block 314.

In one example, the electronic device may check if either an intrinsic or extrinsic property has changed at block 314. If a property has changed, it may be determined that the intrinsic and extrinsic properties are no longer valid, and the flowchart may loop to block 302. If no property has changed, it may be determined that the intrinsic and extrinsic properties are still valid, and the flowchart loops to block 312 (e.g., the display stays in the dynamic compensation mode).

As another example, the electronic device may perform the operations of blocks 302, 304, 306, 308, and 310 at frequency $f_2$ to check if the properties of the removable lens element are still valid. If the intrinsic and extrinsic properties are still valid, the flowchart loops to block 312 (e.g., the display stays in the dynamic compensation mode).

The operations of each block in FIG. 13 may be performed by display 14, control circuitry 16, or eye and/or head tracking system 18.

The foregoing is merely illustrative and various modifications can be made by those skilled in the art without departing from the scope and spirit of the described embodiments. The foregoing embodiments may be implemented individually or in any combination.

What is claimed is:
1. An electronic device comprising:
a display panel configured to produce light;
a lens module that receives the light from the display panel, wherein the lens module comprises a first lens element and a second lens element and wherein the second lens element is a removable lens element that is configured to be selectively attached to the lens module; and
control circuitry that is configured to, based at least on a type of the removable lens element that is attached to the lens module, compensate a target image for geo- metric distortion caused by the lens module to produce a compensated image that is displayed on the display panel.

2. The electronic device defined in claim 1, wherein the control circuitry is configured to compensate the target image for geometric distortion caused by the lens module to produce the compensated image that is displayed on the display panel based at least on the type of the removable lens element that is attached to the lens module and a position of the removable lens element that is attached to the lens module.

3. The electronic device defined in claim 2, further comprising:
- a camera, wherein the control circuitry is configured to determine the position of the removable lens element that is attached to the lens module based on images captured by the camera, wherein the camera is part of an eye tracking system, wherein the control circuitry is also configured to determine viewer eye position information based on the images captured by the camera, and wherein the control circuitry is configured to compensate the target image for geometric distortion caused by the lens module to produce the compensated image that is displayed on the display panel based at least on the type of the removable lens element that is attached to the lens module, the position of the removable lens element that is attached to the lens module, and the viewer eye position information.

4. The electronic device defined in claim 1, wherein the control circuitry is configured to compensate the target image for geometric distortion caused by the lens module to produce the compensated image that is displayed on the display panel based at least on the type of the removable lens element that is attached to the lens module and distortion information associated with the first lens element.

5. The electronic device defined in claim 4, wherein the first lens element is a non-removable lens element.

6. The electronic device defined in claim 1, wherein the control circuitry is configured to compensate the target image for geometric distortion caused by the lens module to produce the compensated image that is displayed on the display panel based at least on the type of the removable lens element that is attached to the lens module and viewer eye position information.

7. The electronic device defined in claim 1, wherein the control circuitry is configured to compensate the target image for geometric distortion caused by the lens module to produce the compensated image that is displayed on the display panel based on the type of the removable lens element that is attached to the lens module, viewer eye position information, a position of the removable lens element that is attached to the lens module, and distortion information associated with the first lens element.

8. The electronic device defined in claim 1, wherein the control circuitry is configured to, based at least on the type of the removable lens element that is attached to the lens module, perform ray tracing to characterize distortion for the lens module and wherein the distortion for the lens module is used to compensate the target image for geometric distortion caused by the lens module to produce the compensated image that is displayed on the display panel.

9. The electronic device defined in claim 1, wherein the control circuitry comprises: distortion assessment circuitry configured to determine lens module distortion information based at least on the type of the removable lens element that is attached to the lens module; and dynamic geometric distortion compensation circuitry that is configured to compensate the target image for geometric distortion based at least on the lens module distortion information, wherein the distortion assessment circuitry is configured to determine the lens module distortion information based at least on the type of the removable lens element that is attached to the lens module, a position of the removable lens element that is attached to the lens module, and distortion information associated with only the first lens element, wherein the distortion assessment circuitry is configured to perform ray tracing from a first virtual surface between the first and second lens elements to a second virtual surface, wherein the second lens element is interposed between the first and second virtual surfaces, wherein the distortion assessment circuitry includes a database with respective curvature information for a plurality of compatible removable lens elements, wherein the dynamic geometric distortion compensation circuitry is configured to receive the lens module distortion information from the distortion assessment circuitry, and wherein the dynamic geometric distortion compensation circuitry is configured to receive viewer eye position information.

10. The electronic device defined in claim 1, wherein the display panel is operable in a dynamic compensation mode and a fixed compensation mode.

11. An electronic device comprising: a camera configured to determine viewer eye position information; a lens assembly comprising a first lens and a second lens, wherein the second lens is a removable lens that is configured to be selectively attached to the lens assembly; and a display configured to emit light towards the lens assembly, wherein the display is operable in a dynamic compensation mode in which displayed images are compensated based on the viewer eye position information and a fixed compensation mode in which displayed images are compensated without using the viewer eye position information.

12. The electronic device defined in claim 11, wherein the display is configured to operate in the dynamic compensation mode in response to a determination that the removable lens is not attached to the lens assembly.

13. The electronic device defined in claim 11, wherein the display is configured to operate in the dynamic compensation mode in response to a determination that the removable lens is attached to the lens assembly, the removable lens is a known removable lens, calibrated intrinsic properties are available for the removable lens, and extrinsic properties for the removable lens are determined within a predetermined confidence range, wherein the calibrated intrinsic properties include measurements of manufactured surfaces of the removable lens, wherein the extrinsic properties include a position and an orientation of the removable lens, and wherein the extrinsic properties are determined using the camera.

14. The electronic device defined in claim 11, wherein the display is configured to operate in the fixed compensation mode in response to a determination that that the removable lens is attached to the lens assembly and the removable lens is not a known removable lens.

15. The electronic device defined in claim 11, wherein the display is configured to operate in the fixed compensation mode in response to a determination that the removable lens is attached to the lens assembly and calibrated intrinsic properties are not available for the removable lens and wherein the calibrated intrinsic properties include measurements of manufactured surfaces of the removable lens.

16. The electronic device defined in claim 11, wherein the display is configured to operate in the fixed compensation mode in response to a determination that the removable lens is attached to the lens assembly and extrinsic properties for the removable lens are not determined within a predetermined confidence range, wherein the extrinsic properties include a position and an orientation of the removable lens, and wherein the extrinsic properties are determined using the camera.

17. The electronic device defined in claim 11, wherein the camera is configured to capture images of an eye through the lens assembly.

18. The electronic device defined in claim 11, wherein, while operating in the fixed compensation mode, the display is configured to periodically evaluate whether to switch to the dynamic compensation mode.

19. The electronic device defined in claim 11, wherein, while operating in the dynamic compensation mode, the display is configured to periodically evaluate whether to stay in the dynamic compensation mode.

20. The electronic device defined in claim 11, wherein information from the camera is used to determine whether the removable lens is attached to the lens assembly.

21. The electronic device defined in claim 11, wherein, in the fixed compensation mode, the displayed images are compensated using predetermined viewer eye position information.

22. A method of operating an electronic device with a display and a lens assembly that comprises a removable lens that is configured to be selectively attached to the lens assembly, the method comprising:
- in accordance with a determination that the removable lens is not present, placing the display in a dynamic compensation mode;
- in accordance with a determination that the removable lens is present but the removable lens is not a known removable lens, placing the display in a fixed compensation mode;
- in accordance with a determination that calibrated intrinsic properties are not available for the removable lens, placing the display in the fixed compensation mode;
- in accordance with a determination that extrinsic properties for the removable lens are not determined within a predetermined confidence range, placing the display in the fixed compensation mode; and
- in accordance with a determination that the removable lens is present, the removable lens is a known removable lens, the calibrated intrinsic properties are available for the removable lens, and the extrinsic properties for the removable lens are determined within the predetermined confidence range, placing the display in the dynamic compensation mode.

\* \* \* \* \*